United States Patent
Iwamoto et al.

(10) Patent No.: US 12,508,922 B2
(45) Date of Patent: Dec. 30, 2025

(54) COOLING CONTROL DEVICE FOR ELECTRIFIED VEHICLE

(71) Applicant: TOYOTA JIDOSHA KABUSHIKI KAISHA, Toyota (JP)

(72) Inventors: Masataka Iwamoto, Toyota (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 18/775,321

(22) Filed: Jul. 17, 2024

(65) Prior Publication Data
US 2025/0145017 A1 May 8, 2025

(30) Foreign Application Priority Data
Nov. 2, 2023 (JP) .................... 2023-188325

(51) Int. Cl.
| | | |
|---|---|---|
| B60K 1/02 | (2006.01) | |
| B60L 15/20 | (2006.01) | |
| H02K 7/116 | (2006.01) | |
| H02K 9/193 | (2006.01) | |
| B60K 1/00 | (2006.01) | |
| B60W 10/08 | (2006.01) | |

(52) U.S. Cl.
CPC .............. B60L 15/20 (2013.01); B60K 1/02 (2013.01); H02K 7/116 (2013.01); H02K 9/193 (2013.01); *B60K 2001/006* (2013.01); *B60L 2260/28* (2013.01)

(58) Field of Classification Search
CPC ...... B60K 1/02; B60K 1/00; B60K 2001/006; B60K 11/02; B60W 10/08; B60W 30/184; H02K 7/116
See application file for complete search history.

(56) References Cited

U.S. PATENT DOCUMENTS

| | | | |
|---|---|---|---|
| 6,549,840 B1 | 4/2003 | Mikami | |
| 2013/0296101 A1* | 11/2013 | Doering | B60W 30/18 180/65.265 |
| 2022/0410868 A1* | 12/2022 | Tabata | B60K 6/547 |

FOREIGN PATENT DOCUMENTS

| | | |
|---|---|---|
| JP | 2001-112114 A | 4/2001 |
| JP | 2014-000848 A | 1/2014 |

* cited by examiner

*Primary Examiner* — Tan Q Nguyen
(74) *Attorney, Agent, or Firm* — SoraIP, Inc.

(57) ABSTRACT

A cooling control device for an electrified vehicle comprising: a first electric oil pump for supplying oil to a first motor for driving a front wheel; and a second electric oil pump for supplying oil to a second motor for driving a rear wheel, wherein the device is capable of switching between a four-wheel drive travel mode and a two-wheel drive travel mode in which a second motor is used as a driving force source; wherein when a two-wheel drive travel mode is selected, the device starts operating the first electric oil pump when only the second electric oil pump is driven and it is predicted to run in a four-wheel drive travel mode.

5 Claims, 10 Drawing Sheets

COOLING CONTROL DEVICE FOR ELECTRIFIED VEHICLE

CROSS-REFERENCE TO RELATED APPLICATION

This application claims priority to Japanese Patent Application No. 2023-188325 filed on Nov. 2, 2023, incorporated herein by reference in its entirety.

BACKGROUND

1. Technical Field

The present disclosure relates to a control device that cools a motor or the like in a vehicle that includes an electric motor (motor) as a drive force source, and more particularly, to a cooling control device that performs cooling using oil.

2. Description of Related Art

Japanese Unexamined Patent Application Publication No. 2001-112114 (JP 2001-112114 A) describes a control device for a four-wheel drive vehicle including a front motor that is a drive force source for a pair of front wheels and a rear motor that is a drive force source for a pair of rear wheels and has a heat rating lower than that of the front motor or a cooling performance lower than that of the front motor. The control device is configured to maintain the drive force required for the vehicle by increasing the output of the front motor when the operation of the rear motor is limited, and to ensure the travel stability by setting the distribution ratio of torque between the front and rear wheels to a desired distribution ratio by reducing the output of the rear motor when the operation of the front motor is limited.

Japanese Unexamined Patent Application Publication No. 2014-000848 (JP 2014-000848 A) describes a hybrid electric vehicle that includes an engine and a motor as drive force sources and that can be set to an HV travel mode in which the engine is driven to travel and an EV travel mode in which the engine is stopped and the motor is driven to travel. In addition, the hybrid electric vehicle includes a mechanical oil pump driven by the power of the engine and an electric oil pump driven by an electric motor, the oil pumps being provided in parallel, and only one of the mechanical oil pump and the electric oil pump with a higher discharge force is driven when the viscosity of the coolant discharged by the oil pumps is high, and only the other oil pump is driven when the viscosity of the coolant is low.

SUMMARY

Since the four-wheel drive vehicle described in JP 2001-112114 A can drive the front wheels and the rear wheels independently, two-wheel drive travel can be performed by driving only one of the drive force sources. In addition, since a plurality of drive force sources is provided, it is considered that a plurality of cooling oil pumps or one large oil pump is to be provided, in order to ensure the cooling performance for the drive force sources during four-wheel drive travel. When a plurality of oil pumps or a large oil pump is provided as described above, electric power or power for driving the oil pump(s) is lost when each oil pump is driven during two-wheel drive travel, which may reduce the energy efficiency of the entire vehicle.

The present disclosure has been made in view of the above technical issues, and an object thereof is to provide a control device for a four-wheel drive vehicle, capable of improving energy efficiency while suppressing a reduction in the cooling performance of drive force sources.

In order to achieve the above object, an aspect of the present disclosure provides a cooling control device for an electrified vehicle including a first motor that drives a first drive wheel as one of front and rear wheels, a first electric oil pump that supplies oil to the first motor, a second motor that drives a second drive wheel as another of the front and rear wheels, a second electric oil pump that supplies the oil to the second motor, a first drive unit that transfers torque from the first motor to the first drive wheel, a second drive unit that transfers torque from the second motor to the second drive wheel, and a mechanical oil pump driven by the first drive unit to supply the oil to the first drive unit, the electrified vehicle being switchable between a four-wheel drive travel mode in which the first motor and the second motor are used as drive force sources and a two-wheel drive travel mode in which the second motor is used as a drive force source, the cooling control device including a controller that controls the first electric oil pump and the second electric oil pump, in which the controller includes: a pump selection unit that drives only the second electric oil pump out of the first electric oil pump and the second electric oil pump when the two-wheel drive travel mode is selected; a prediction unit that predicts traveling in the four-wheel drive travel mode; and a start control unit that starts operating the first electric oil pump when the prediction unit predicts traveling in the four-wheel drive travel mode.

In the present disclosure, the cooling control device may further include a mode selection unit operated by a driver to select the four-wheel drive travel mode, and the prediction unit may predict traveling in the four-wheel drive travel mode based on presence or absence of an operation of the mode selection unit.

In the present disclosure, the controller may be configured to increase an amount of the oil supplied to the first motor by the first electric oil pump as a temperature of the first motor is higher, and increase an amount of the oil supplied to the second motor by the second electric oil pump as a temperature of the second motor is higher.

In the present disclosure, the four-wheel drive travel mode may include a plurality of travel modes; and the controller may be configured to control an amount of the oil supplied to the first motor by the first electric oil pump and an amount of the oil to the second motor supplied by the second electric oil pump according to the travel modes.

In the present disclosure, the four-wheel drive travel mode may include at least one of a track mode in which a turning performance is enhanced compared to the two-wheel drive travel mode, a drift mode in which driving accuracy is improved, a sport mode in which an acceleration performance or a power performance is improved, and a manual range mode in which driving torque of the first motor and the second motor is controlled based on driving characteristic corresponding to a shift operation by the driver.

According to the present disclosure, a first motor that drives a first drive wheel as one of the front and rear wheels, and a second motor that drives a second drive wheel as the other wheel, are provided, and the second motor is used as a drive force source when the two-wheel drive travel mode is set. That is, the first motor is not energized, and therefore the first motor does not generate heat and does not need to be cooled. Thus, the amount of electric power consumed by the entire electrified vehicle can be reduced by stopping the first electric oil pump provided in correspondence with the first motor or maintaining the first electric oil pump in a stationary state. That is, it is possible to improve energy efficiency while suppressing a reduction in the cooling performance of the second motor that serves as a drive force source in the two-wheel drive travel mode. In other words, it is possible to reduce the size of the second electric oil pump, since the second electric oil pump provided in correspondence with the second motor only needs to function to cool the second motor, as the first electric oil pump that supplies oil only to the first motor that is stopped during travel in the two-wheel drive travel mode is provided.

In addition, also during travel in the two-wheel drive travel mode, the first drive wheels are rotated to rotate the first drive unit at a rotational speed corresponding to the vehicle speed. That is, the mechanical oil pump is activated. Thus, the oil is supplied to portions of the first drive unit to be lubricated, and therefore it is possible to suppress a reduction in the durability of the first drive unit. In other words, the oil is supplied only to portions to be supplied with the oil, and therefore it is possible to reduce a power loss for driving the mechanical oil pump.

Further, the first motor can be supplied with oil to be cooled before the first motor is energized to generate electricity, as the first electric oil pump that has been stationary is started when travel in the four-wheel drive mode is predicted. As a result, the first electric oil pump can be operating when travel in the four-wheel drive travel mode is started, and therefore it is possible to suppress a reduction in the cooling performance for the first motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will now be described with reference to the accompanying drawings.

Note that the embodiments described below are merely examples of the implementation of the present disclosure, and do not limit the present disclosure.

Electrified vehicle is a four-wheel vehicle having two wheels on a front side and two wheels on a rear side, and is an electrified vehicle in which a motor as a driving force source is provided on each of the two wheels on the front side and two wheels on the rear side, so that each of the two wheels on the front side and two wheels on the rear side can be driven independently of each other. The front two wheels may be connected to a driving force source for the front wheels via an appropriate differential mechanism, and the rear two wheels may be connected to a driving force source for the rear wheels via an appropriate other differential mechanism. Further, electrified vehicle of the present disclosure may be an electrified vehicle in which a motor as a driving force source is provided corresponding to each of the front and rear four wheels, and the driving torque and the regenerative braking torque (regenerative torque) of each of the four wheels can be controlled independently of each other.

Figure 1:
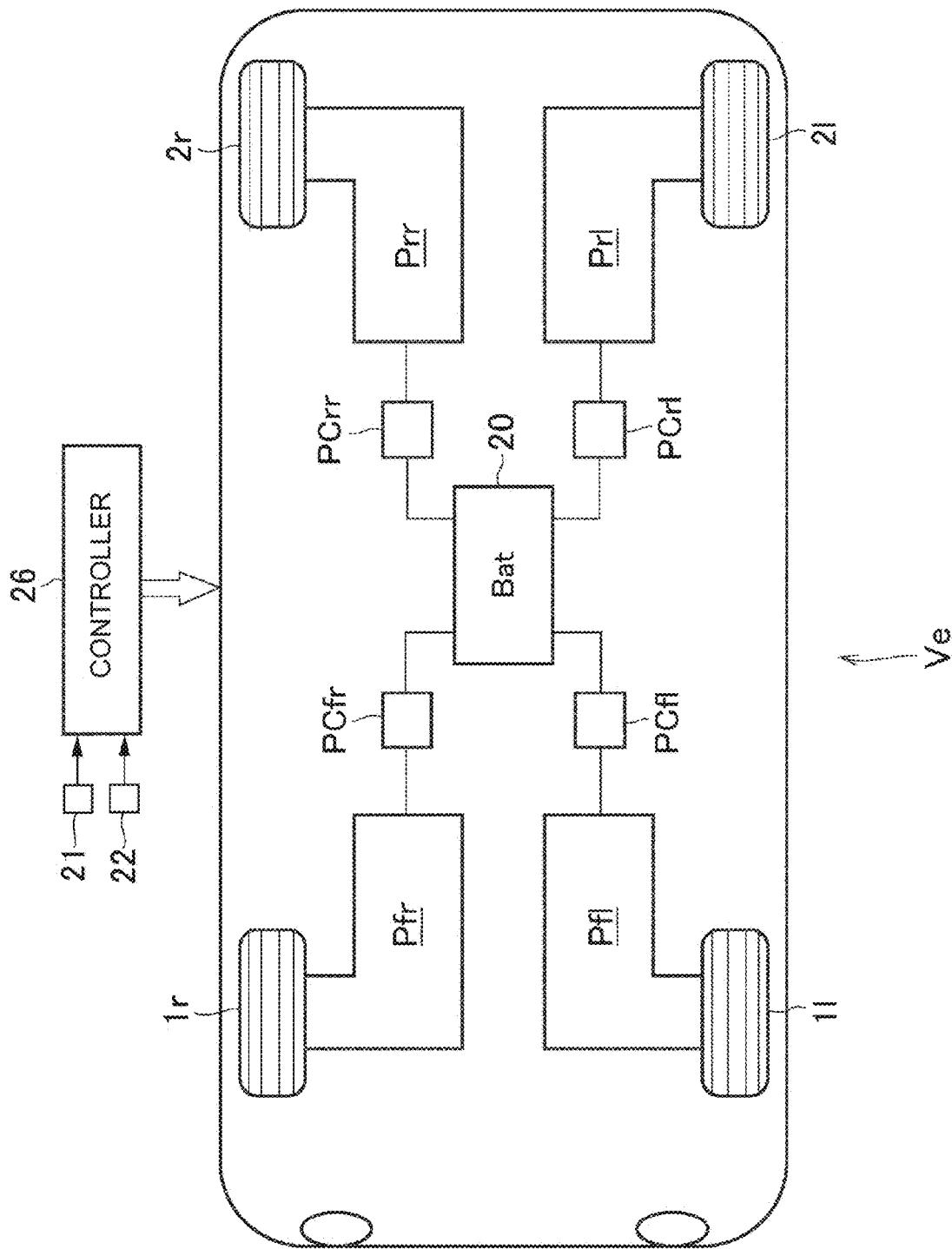
FIG. 1 is a block diagram schematically showing a drive system of a four-wheel independent drive vehicle according to an embodiment of the present disclosure.

FIG. 1 schematically illustrates an example of a four-wheel independent drive vehicle configured to be able to drive all four wheels independently of each other in addition to being able to control the drive torque or the regenerative braking torque between the front wheel and the rear wheel independently of each other. Electrified vehicle (hereinafter simply referred to as vehicles) Ve shown here includes left and right front wheels $1r$, $1l$ and left and right rear wheels $2r$, $2l$, and a drive unit Pf, Pr as a drive force source is provided corresponding to each of the front wheels $1r$, $1l$ and the rear wheels $2r$, $2l$. Each of the drive units Pf, Pr is mainly constituted by a motor and a gear reduction mechanism (transmission mechanism).

Figure 2:
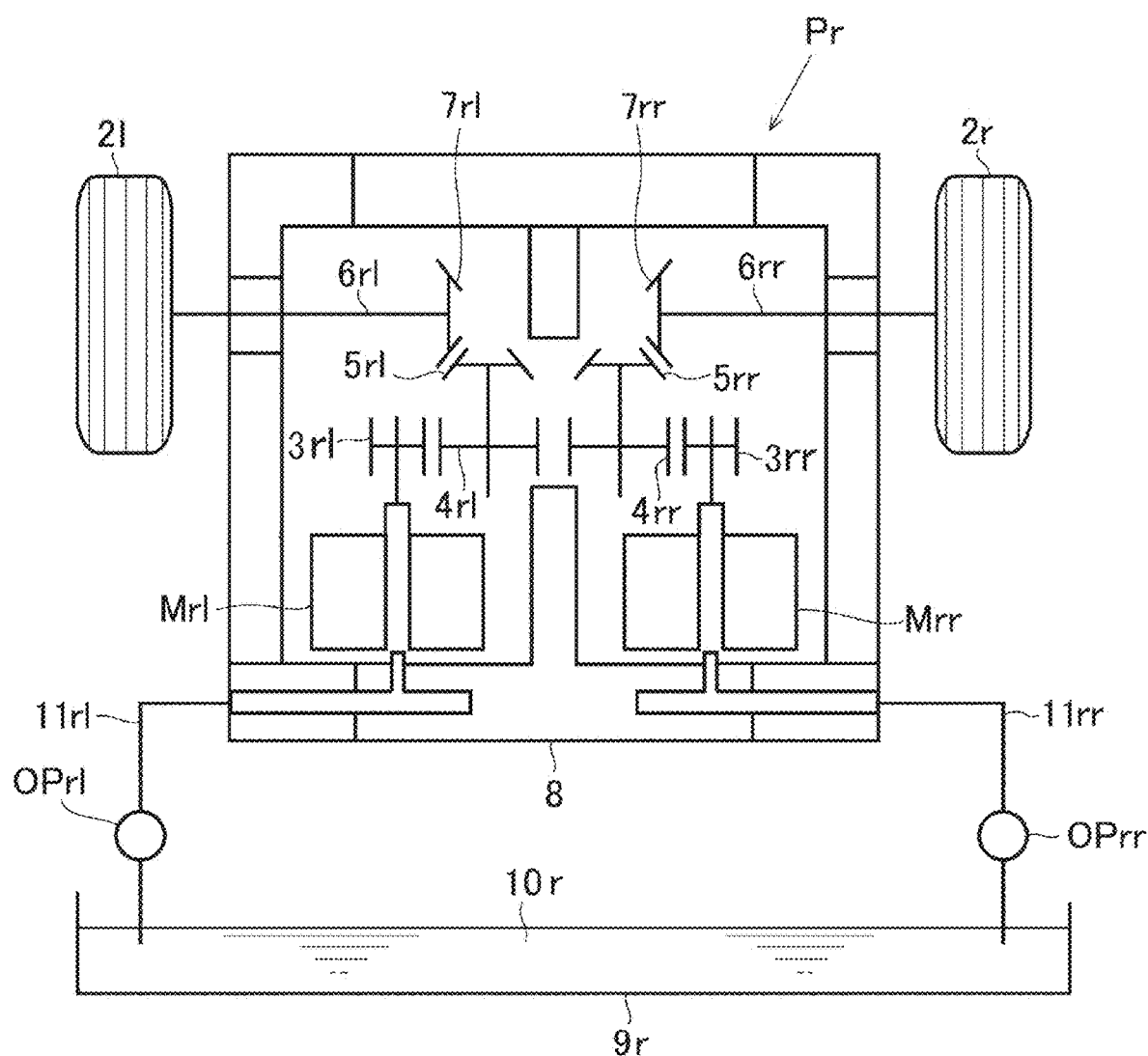
FIG. 2 is a skeleton diagram illustrating an example of a drive unit on a rear wheel side.

FIG. 2 is a skeleton diagram illustrating an exemplary drive unit Pr on the rear wheel $2r$, $2l$. This drive unit Pr is constituted by a pair of drive systems that control the left and right rear wheel $2r$, $2l$ independently of each other, and these drive systems are symmetrical in configuration, and therefore will be described collectively without being limited to "right" or "left". In the following description, when the suffix of the reference numerals is one character, "f" is for the front wheel, "l" is for the left wheel, "r" is for the right wheel or for the rear wheel, and when it is two characters, "f" of the first character is for the front wheel, "r" is for the rear wheel, "r" of the second character is for the right wheel, and "l" is for the left wheel.

In the drive unit Pr of the rear wheel $2r$, $2l$, a motor Mrr, Mrl is mounted with its rotational center axis directed toward the front-rear direction of the vehicle Ve, a drive gear $3rr$, $3rl$ is attached to the rotor axis, and the drive gear $3rr$, $3rl$ meshes with the counter driven gear $4rr$, $4rl$. The counter driven gear $4rr$, $4rl$ is larger in diameter than the drive gear $3rr$, $3rl$, and therefore these gear pairs constitute a reduction gear. A counter drive gear $5rr$, $5rl$ which is a bevel gear is provided so as to integrally rotate on the same axis as the counter driven gear $4rr$, $4rl$, and the counter drive gear $5rr$, $5rl$ meshes with a driven gear $7rr$, $7rl$ which is a bevel gear integrated with a drive shaft $6rr$, $6rl$ connected to a rear wheel $2r$, $2l$. By making the driven gear $7rr$, $7rl$ larger in diameter than the counter drive gear $5rr$, $5rl$, the gear pair can be a reduction gear.

These rear wheel $2r$, $2l$ correspond to the "second drive wheels" in the embodiment of the present disclosure, these motor Mrr, Mrl correspond to the "second motor" in the embodiment of the present disclosure, and the part that transmits the torque from these motor Mrr, Mrl to the rear wheel 2r, 2l corresponds to the "second drive part" in the embodiment of the present disclosure.

The motor Mrr, Mrl, the reduction gear, and the bevel gears are accommodated in the casing 8 in a liquid-tight manner. An electric oil pump OPrr, OPrl for supplying oil for cooling/lubricating to the motor Mrr, Mrl inside the casing 8 is provided. The oil pump on the rear wheel 2r, 2l may be a single oil pump that collectively supplies oil 10r to the left and right motor Mrr, Mrl. These oil pumps OPrr, OPrl are provided outside the casing 8 at appropriate positions on Ve of the vehicle, and are configured to draw up oil 10r from the oil reservoir 9r and supply oil 10r to the motor Mrr, Mrl via a cooling oil passage 11rr, 11rl provided through the casing 8.

Although not particularly illustrated, the oil 10r is recirculated from the inside of the casing 8 to the oil reservoir 9r. In addition, an oil cooler may be provided in the middle of the cooling oil passage 11rr, 11rl. These oil pump OPrr, OPrl correspond to the "second electric oil pump" in the embodiment of the present disclosure.

Figure 3:
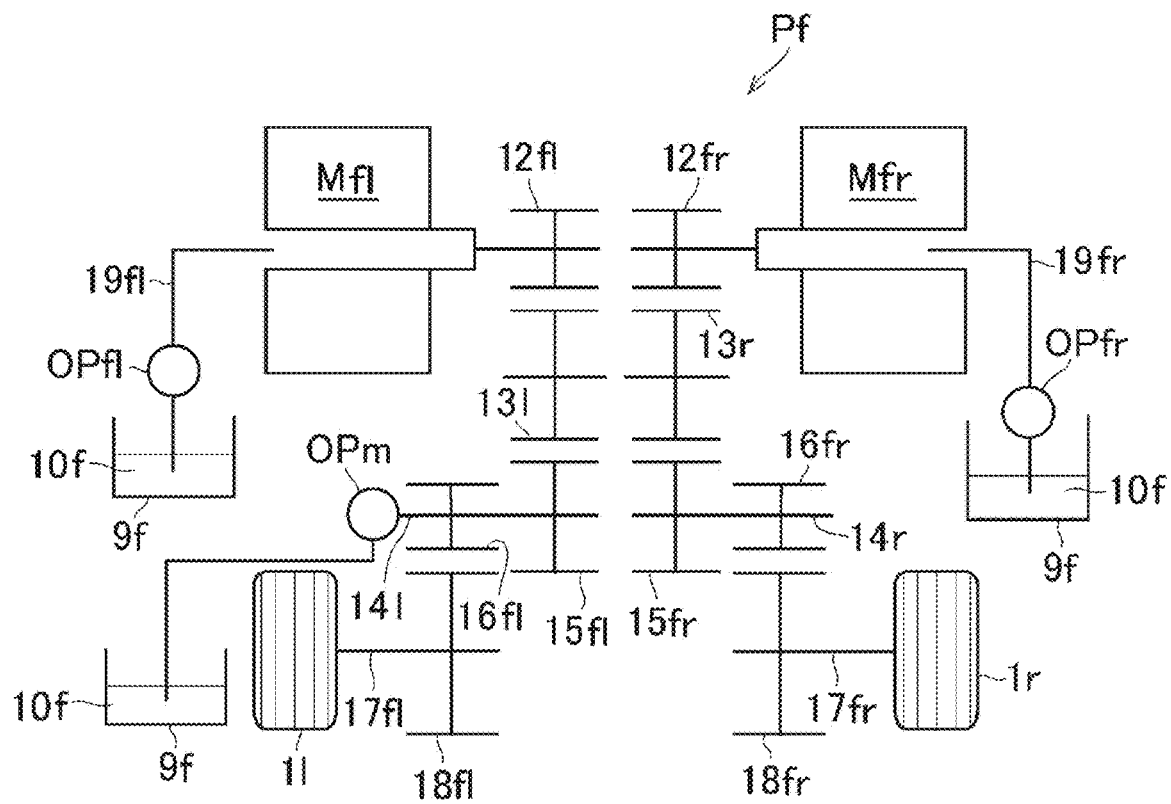
FIG. 3 is a skeleton diagram illustrating an example of a drive unit on a front wheel side.

FIG. 3 is a skeleton diagram illustrating an exemplary drive unit Pf on the front wheel 1r, 1l. Since the drive unit Pf has a bilaterally symmetrical configuration, it will be described collectively without particular reference to "right" and "left". A motor Mfr, Mfl is mounted with its rotational center axis oriented in the lateral direction of the vehicle Ve, and a drive gear 12fr, 12fl is attached to the rotor axis, and the drive gear 12fr, 12fl meshes with the idle gear 13r, 13l. The counter shaft 14r, 14l is parallel to the rotational center axis of the idle gear 13r, 13l, and the idle gear 13r, 13l meshes with the counter driven gear 15fr, 15fl mounted on the counter shaft 14r, 14l.

Since the counter driven gear 15fr,15fl has a larger diameter than the drive gear 12fr, 12fl attached to the motor Mfr, Mrl, the gear pair constitutes a reduction gear. A counter drive gear 16fr, 16fl is attached to the counter shaft 14r, 14i, and the counter drive gear 16fr, 16fl meshes with a driven gear 18fr, 18fl integral with a drive shaft 17fr, 17fl connected to the front wheel 1r, 1l. Since the driven gear 18fr, 18fl has a larger diameter than that of the counter drive gear 16fr, 16fl, the gear pair constitutes a reduction gear.

The front wheel 1r, 1l corresponds to the "first drive wheel" in the embodiment of the present disclosure, the motor Mfr, Mfl corresponds to the "first motor" in the embodiment of the present disclosure, and the part that transmits the torque from the motor Mfr, Mfl to the front wheel 1r, 1l corresponds to the "first drive part" in the embodiment of the present disclosure.

The motor Mfr, Mfl on the front wheel 1r, 1l side is configured to be cooled by an oil 10f similarly to the motor Mrr, Mrl on the rear wheel 2r, 2l side. That is, an electric oil pump OPfr, OPfl is provided corresponding to the motor Mfr, Mfl on the front wheel 1r, 1l, and these oil pump OPfr, OPfl are configured to draw oil 10f from the oil reservoir 9f and supply oil 10f to the motor Mfr, Mfl via the cooling oil passage 19fr, 19fl.

Although not particularly illustrated, the oil cooled by the motor Mfr, Mfl is configured to return to the oil reservoir 9r. In addition, an oil cooler may be provided in the middle of the cooling oil passage 19fr, 19fl. Note that the oil pump on the front wheel 1r, 1l side may be a single oil pump that collectively supplies oil 10f to the left and right motor Mfr, Mfl in the same manner as the oil pump on the rear wheel 2r, 2l side described above. These oil pump OPfr, OPfl correspond to the "first electric oil pump" in the embodiment of the present disclosure.

An oil pump OPm is provided for pumping oil for lubrication. The oil pump OPm is a mechanical pump, and is connected to a counter shaft 14l on the left front wheel 1l in the embodiment shown in FIG. 3. Therefore, the oil pump OPm is driven when the vehicle Ve is traveling, and is configured to pump the oil 10f from the oil reservoir 9f and supply the oil 10f to a predetermined lubricating portion such as a gear or a bearing provided in the drive unit Pf on the front wheel 1r, 1l.

A power storage device (Bat) 20 that exchanges electric power with the motor Mfr, Mfl, Mrr, Mrl and the oil pump OPfr, OPfl, OPrr, OPrl is provided. The power storage device 20 mainly includes a secondary battery such as a lithium-ion battery or an all-solid-state battery. The motor Mfr, Mfl, Mrr, Mrl are, for example, permanent magnet-type synchronous motors, and these motor Mfr, Mfl, Mrr, Mrl are connected to the power storage device 20 via a power-controller PCfr, PCfl, PCrr, PCrl mainly composed of inverters. Therefore, the motor Mfr, Mfl, Mrr, Mrl individually control the outputting torque and the braking torque at the time of energy regeneration independently of each other. Note that the power-controller PCfr, PCfl, PCrr, PCrl may be configured as a single unit as a whole, as long as the functions thereof are independent of each other.

In the vehicle Ve configured as described above, the output torque of each motor Mfr, Mfl, Mrr, Mrl can be controlled independently of each other, and therefore, for example, the two-wheel drive travel mode in which the motor Mrr, Mrl is controlled as a driving force source and the energization to the motor Mfr, Mfl is stopped, and the four-wheel drive travel mode in which the motor Mfr, Mfl, Mrr, Mrl is controlled as a driving force source can be switched. Further, in the case of traveling in the four-wheel drive travel mode, the ratio of the output torque of the front and rear motors can be appropriately changed based on the traveling characteristics and the like required by the driver.

A mode selection switch (mode selection unit) 21 for the driver to select the traveling characteristic (traveling mode) is provided on the vehicle Ve. Specifically, the traveling mode is mainly a control mode in which the driving torque is controlled based on a predetermined reference, and is a track mode in which the turning performance is improved by controlling the driving torque and the regenerative torque (braking torque) of the motor Mfr, Mfl, Mrr, Mrl, a drift mode in which the understeer is eliminated by individually controlling the respective torques of the four wheels or the agility and the driving accuracy during the turning travel are improved by controlling the optimal traction, and a manual sport mode in which the high drive torque is secured up to high vehicle speeds to improve acceleration performance or dynamic performance by controlling the gearshift (gear ratio). These running modes control the balance of the torque of the front and rear wheels, or because it is intended to output a large driving torque, corresponding to the four-wheel drive running mode to travel by driving all of the motor Mfr, Mfl, Mrr, Mrl.

The above-described mode selection switch 21 is configured to select one of these driving modes, or to cancel the selection to select the normal mode. A plurality of mode selection switches 21 may be provided corresponding to the traveling mode, and one mode selection switch may be provided, and the traveling mode selected by the number of operations may be sequentially switched.

Further, the vehicle Ve shown in FIG. 1 is configured to be able to set a manual range mode in which a driving characteristic, which is a relation between an accelerator operation amount and a required driving torque, is changed in accordance with a shifting operation performed by a driver. This manual range mode, for example, D range, 3 range, 2 range, and is configured to be able to select four shift ranges of the L range (or 1 range).

Figure 4:
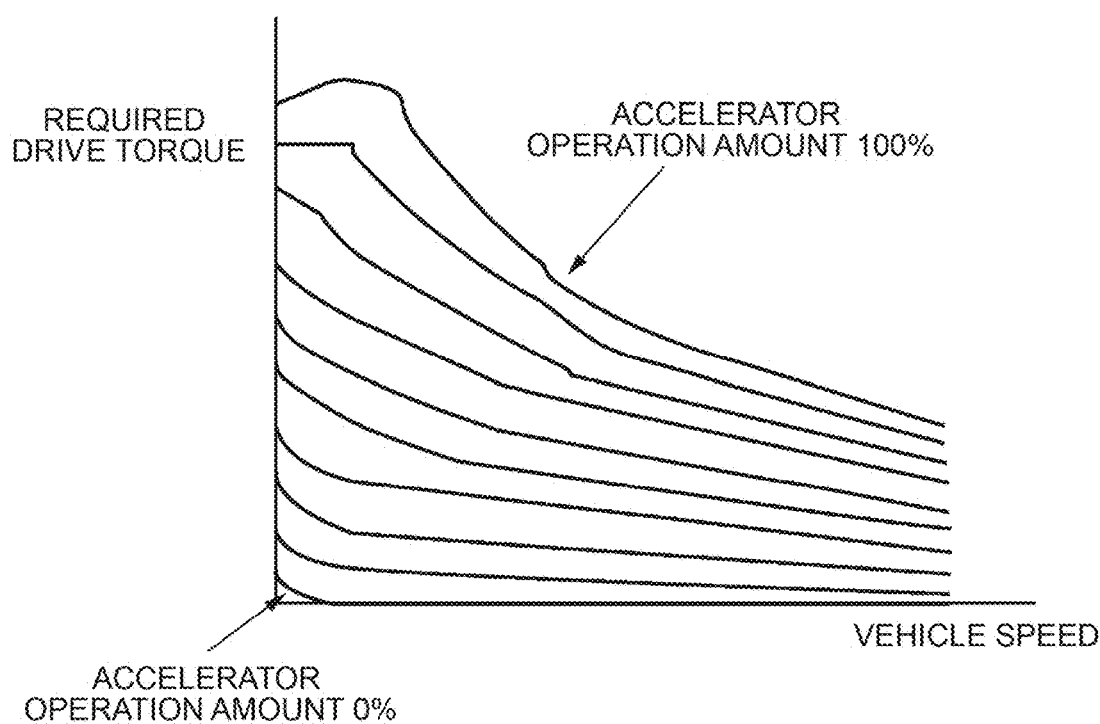
FIG. 4 is a schematic diagram illustrating a required driving torque map used in the D range.

FIG. 4 illustrates an example of a drive torque map for determining a required drive torque when the D range is selected. In FIG. 4, the vehicle speed is taken on the horizontal axis and the required driving torque is taken on the vertical axis, and each accelerator operation amount is indicated by a curve. That is, the larger the accelerator operation amount is, the larger the required driving torque is set, and the higher the vehicle speed is, the smaller the required driving torque is set. As described above, the drive torque map for determining the required drive torque in accordance with the accelerator operation amount and the vehicle speed is determined for each selected shift range.

Figure 5:
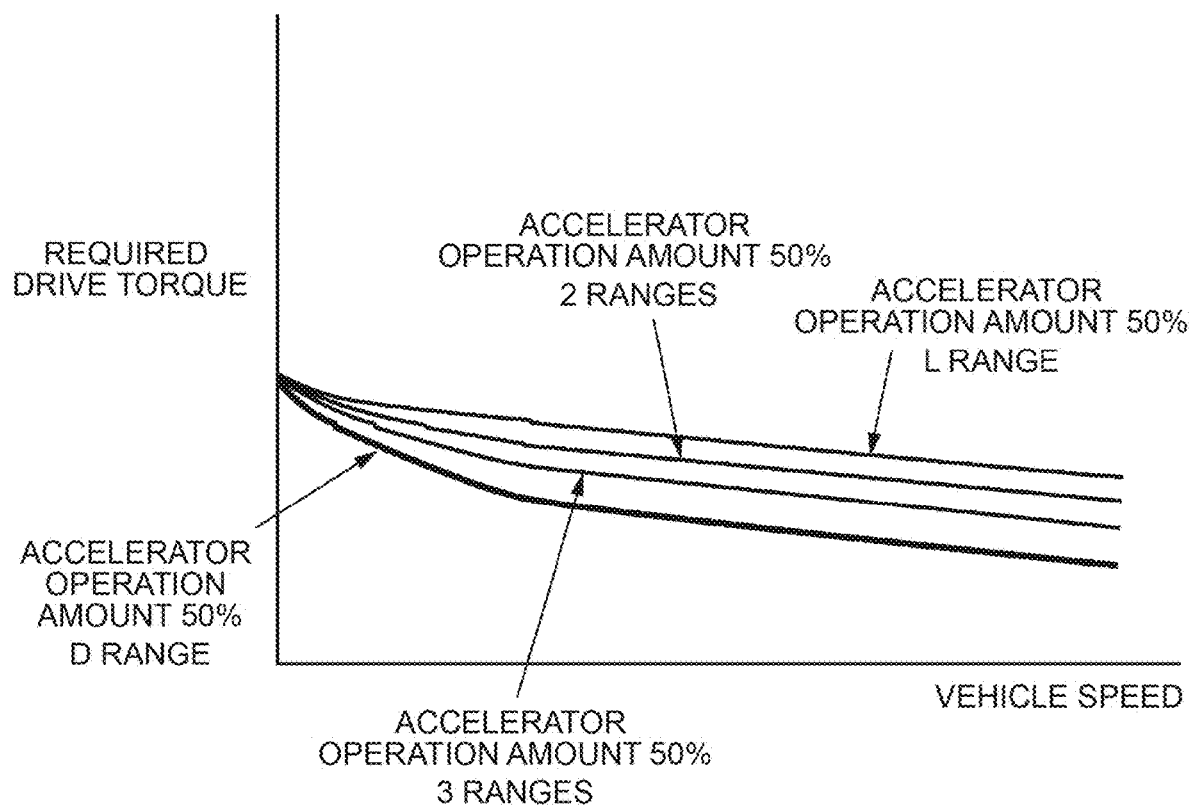
FIG. 5 is a diagram schematically showing a required driving torque map having an accelerator operation amount of 50% in the D range or the L range.

FIG. 5 shows the required driving torque set when the accelerator operation amount is 50% in order to show the difference in the required driving torque for each shift range. In FIG. 5, the vehicle speed is taken on the horizontal axis and the required driving torque is taken on the vertical axis, and each curve indicates the required driving torque to be set in the case where the D range, the 3 range, the 2 range, and the L range are selected in order from the lower side in FIG. 5. That is, the drive torque map corresponding to each shift range is defined so that the required drive torque increases as the shift range changes from the D range toward the L range.

The shift range switching may be configured to select a shift range by operating a shift lever provided in a floor, a center console, or the like, or may be configured to select a shift range by operating a shift switch such as a paddle switch provided in an instrument panel, a steering wheel, a steering column, or the like.

Figure 6:
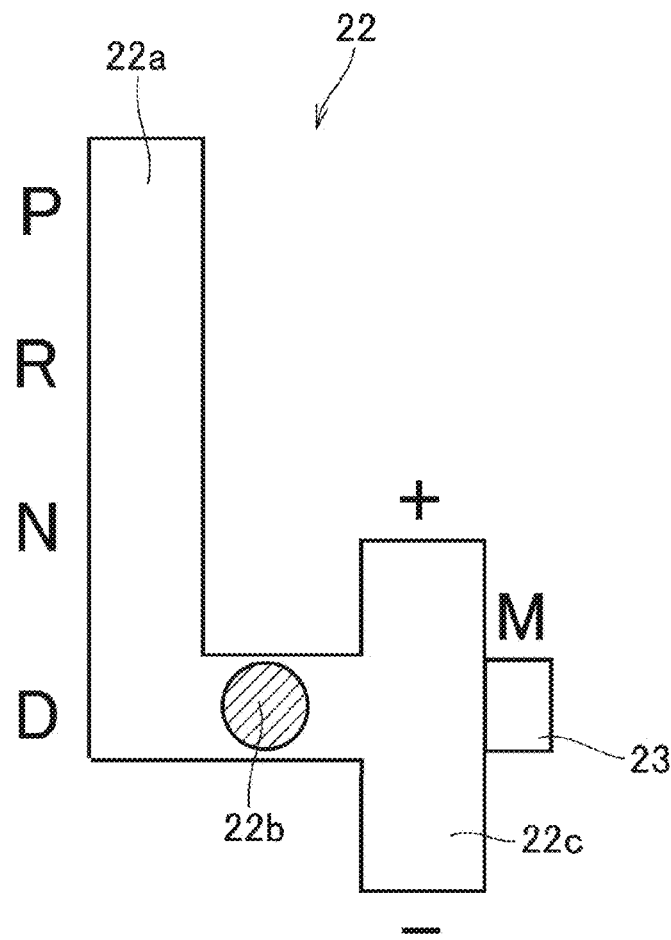
FIG. 6 is a diagram illustrating an example of a shift device that selects a shift range by operating a shift lever.

FIG. 6 shows an example of the configuration of the shift device 22 that selects the shift range by operating the shift lever. The shift device 22 shown in FIG. 6 has a configuration similar to that of the conventional shift device used in vehicles equipped with a conventional automatic transmission (multi-stage transmission), and is configured to select the D position, the N position, the R position, and the P position by moving the shift lever 22b in the shift gate 22a shown on the left side of FIG. 6. The shift device 22 is configured to select the manual range mode by moving the shift lever 22b from the D position to the shift gate 22c shown on the right side of FIG. 6. It should be noted that the neutral position detecting switch 23 provided in the shift gate 22c detects the shift of the shift lever 22b to the shift gate 22c shown in the right side of FIG. 6.

In the manual range mode, the shift lever 22b is moved to the up (+) side in the shift gate 22c so as to shift one stage to the range in which the required drive torque decreases. That is, the range corresponding to the upshift in the conventional transmission is switched. On the other hand, when the shift lever 22b is moved to the down (−) side, the shift lever shifts one stage to the range in which the required driving torque increases. That is, the range corresponding to the downshift in the conventional transmission is switched.

Figure 7:
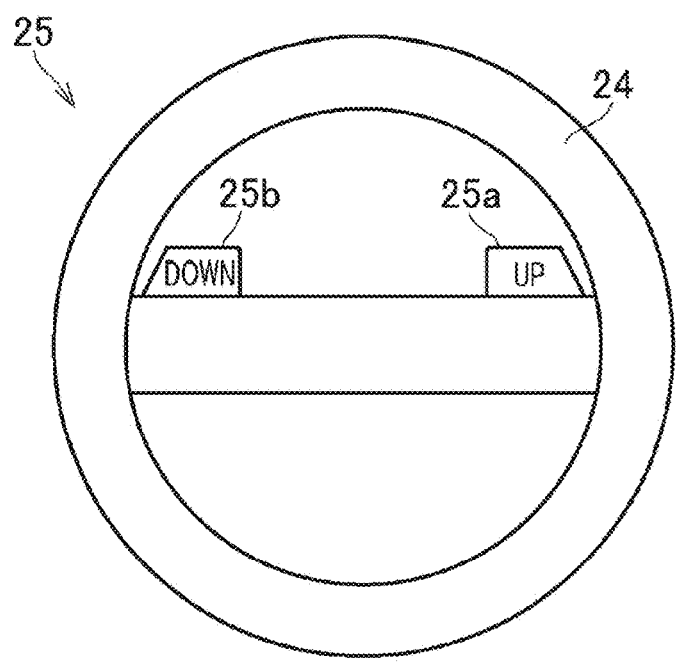
FIG. 7 is a diagram illustrating an example of a shift device that selects a shift range by operating a paddle switch.

FIG. 7 shows an example of the configuration of the shift device 22 that selects the shift range by operating the paddle switch. In the embodiment shown in FIG. 7, similar to the conventional paddle switch used in vehicles equipped with a conventional automatic transmission (multi-stage transmission), the steering wheel 24 is provided with the paddle switch 25, and the paddle switch (UP switch) 25a is operated once (turned ON) while the manual range mode is selected by the shift device 22 or the like, so that the required drive torque is shifted by one stage to the range in which the required drive torque is reduced. That is, the range corresponding to the upshift in the conventional transmission is switched. In addition, when the manual range mode is selected by the shift device 22 or the like, the paddle switch (DOWN switch) 25b shown in FIG. 7 is operated once (turned ON), thereby shifting one stage to a range in which the required driving torque increases. That is, the range corresponding to the downshift in the conventional transmission is switched.

Figure 8:
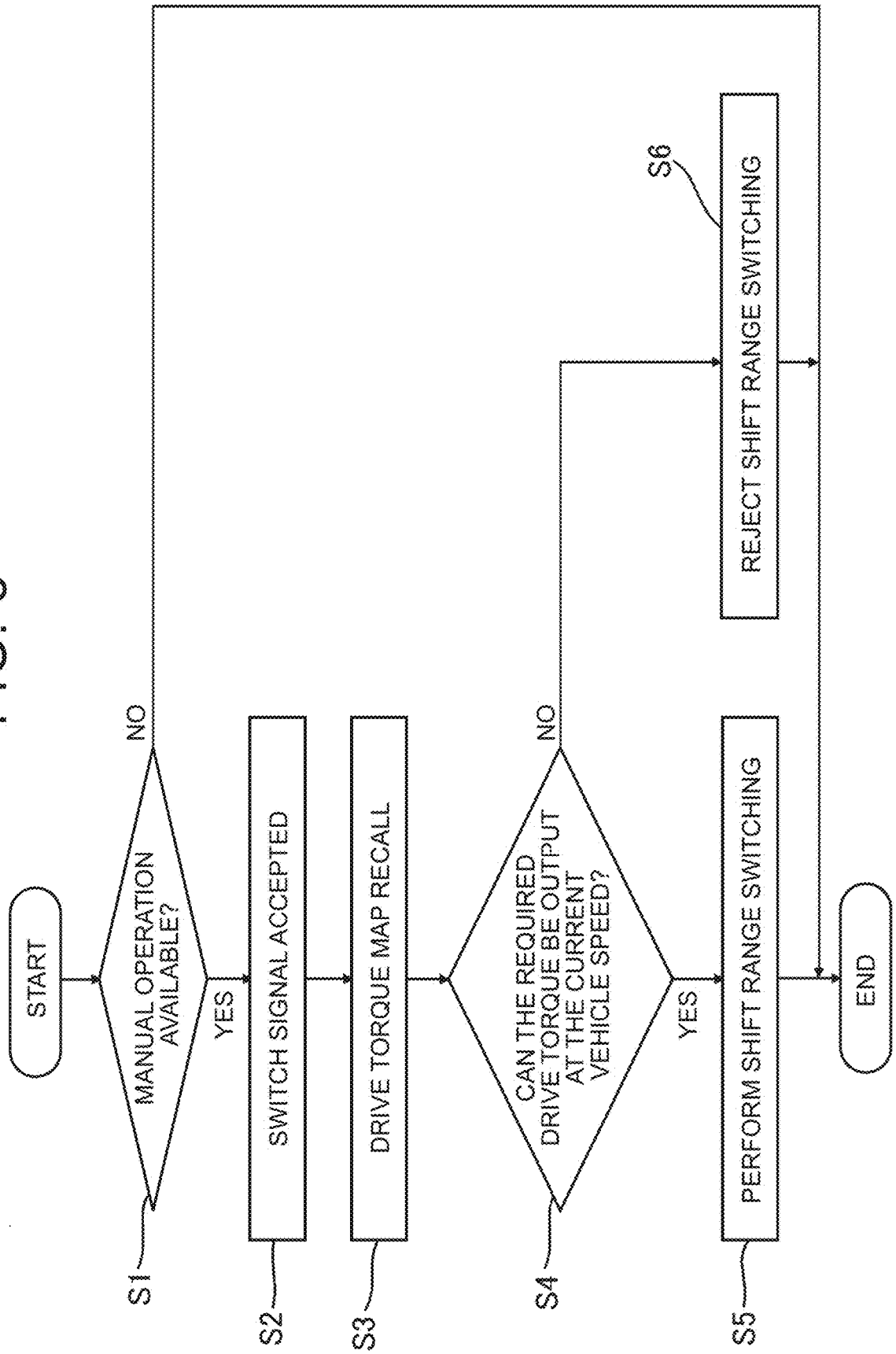
FIG. 8 is a flowchart for explaining an example of control for determining whether or not to switch the shift range.

The change of the shift range is configured such that the controller 26 determines whether or not the shift range is switched based on a signal input from the shift device 22 to the controller 26, which will be described later, similarly to a vehicle equipped with a conventional automatic transmission. An example of control for determining whether or not to switch the shift range will be briefly described with reference to a flowchart shown in FIG. 8. In the control illustrated in FIG. 8, first, whether or not the manual range mode is selected by the shift device 22, that is, whether or not the manual operation is performed is determined (S1), and when the manual operation is performed, the shift lever 22b and the paddle switch 25 are operated to receive a switch signal (S2).

Then, a required shift range is selected by operating the shift lever 22b or the paddle switch 25, and a drive torque map corresponding to the selected required shift range is called (S3). Then, the required driving torque is calculated from the current vehicle speed and the accelerator operation amount by referring to the called driving torque map, and it is determined whether or not the required driving torque can be output at the current vehicle speed, such as whether or not the calculated required driving torque is equal to or more than the torque obtained by summing the maximum torques of all the motor Mfr, Mfl, Mrr, Mrl (S4). When the required drive torque can be output, the shift range is switched (S5), and when the required drive torque cannot be output, the shift range is switched (S6). If the manual operation is not performed, the routine is terminated as it is.

Therefore, in the case where the manual range mode can be switched to the shift range corresponding to the shift operation by the driver, for example, when the manual range mode is changed from the D range to the L range in an extremely short time, the required driving torque rapidly increases. In addition, since the manual range mode is usually a mode selected when a relatively large drive torque is required, there is a possibility that the accelerator operation amount increases and the required drive torque increases after switching to the manual range mode. Therefore, when the manual range mode is selected, all the motor Mfr, Mfl, Mrr, Mrl are driven to travel. That is, the manual range mode corresponds to the four-wheel drive travel mode.

Controller 26 for controlling the respective motor Mfr, Mfl, Mrr, Mrl and the respective electric oil pump OPrl, OPrr, OPfl, OPfr is provided based on the above-described driving modes, shift ranges, and the like. The controller 26 is mainly composed of a microcomputer, and is configured to perform an operation according to a predetermined program using input data and data stored in advance, and to output the result of the operation to the motor Mfr, Mfl, Mrr, Mrl and the electric oil pump OPrl, OPrr, OPfl, OPfr as control command signals.

Figure 9:
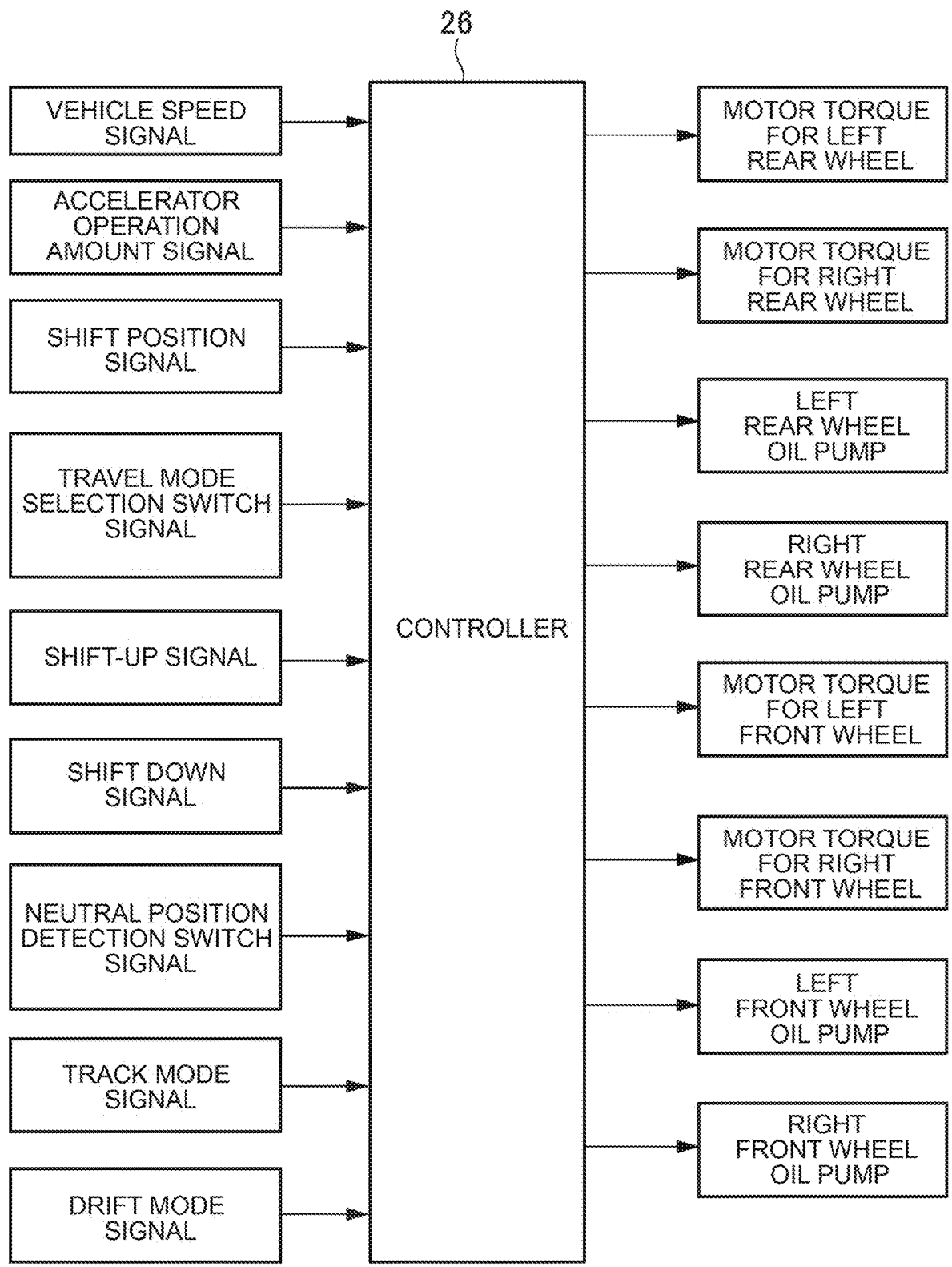
FIG. 9 is a block diagram illustrating input/output signals of a controller.

An example of an input signal and an output signal for performing such control is shown in FIG. 9. Examples of the input signal include a vehicle speed signal, an accelerator operation amount signal, a shift position signal, a travel mode selection switch signal, a shift-up (+) signal, a shift-down (−) signal, a neutral position detection switch signal, a track mode signal, a drift mode signal, and the like. Examples of the command signal to be output include torque of the motor Mrl for the left rear wheel 2l, torque of the motor Mrr for the right rear wheel 2r, control signal of the oil pump OPrl for the left rear wheel 2l, control signal of the oil pump OPrr for the right rear wheel 2r, torque of the motor Mfl for the left front wheel 1l, torque of the motor Mfr for the right front wheel 1r, control signal of the oil pump OPfl for the left front wheel 1l, control signal of the oil pump OPfr for the right front wheel 1r, and the like.

In the above-described vehicle Ve, when the two-wheel drive travel mode is selected, the motor Mrr, Mrl is driven, and the energization of the motor Mfr, Mfl is stopped. Therefore, in order to reduce the power consumed by the vehicle Ve, the oil pump OPrl for the left rear wheel 2l and the oil pump OPrr for the right rear wheel 2r are operated, and the oil pump OPfl for the left front wheel 1l and the oil pump OPfr for the right front wheel 1r are stopped. On the other hand, when the four-wheel drive travel mode is selected, the motor Mfr, Mfl, Mrr, Mrl are driven. Therefore, each electric oil pump OPrl, OPrr, OPfl, OPfr is operated to cool each motor Mfr, Mfl, Mrr, Mrl. Therefore, the controller 26 is configured to start operating the oil pump OPfl for the left front wheel 1l and the oil pump OPfr for the right front wheel Ir when switching to the four-wheel drive travel mode is predicted when the two-wheel drive travel mode is selected and the vehicle is traveling.

Figure 10:
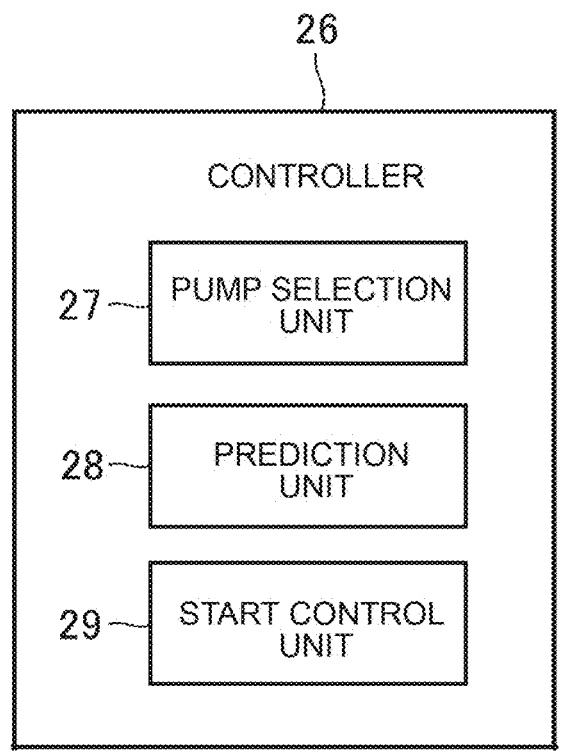
FIG. 10 is a block diagram illustrating a functional configuration of a controller.

FIG. 10 shows an exemplary functional configuration for controlling each electric oil pump OPrl, OPrr, OPfl, OPfr in the controller 26. In the example illustrated in FIG. 10, a pump selection unit 27, a prediction unit 28, and a start control unit 29 are configured. The pump selection unit 27 is configured to select the oil pump OPrl for the left rear wheel 2l and the oil pump OPrr for the right rear wheel 2r as the electric oil pump to be driven when the two-wheel drive travel mode is selected. Further, the prediction unit 28 is configured to predict that the vehicle travels in the four-wheel drive travel mode based on an on-off signal of the mode selection switch 21, a switch signal of the shift device 22, and the like. Further, the start control unit 29 is configured to start operating the stopped electric oil pump (the oil pump OPfl for the left front wheel 1l and the oil pump OPfr for the right front wheel 1r) when the vehicle is predicted to travel in the four-wheel drive travel mode.

Figure 11:
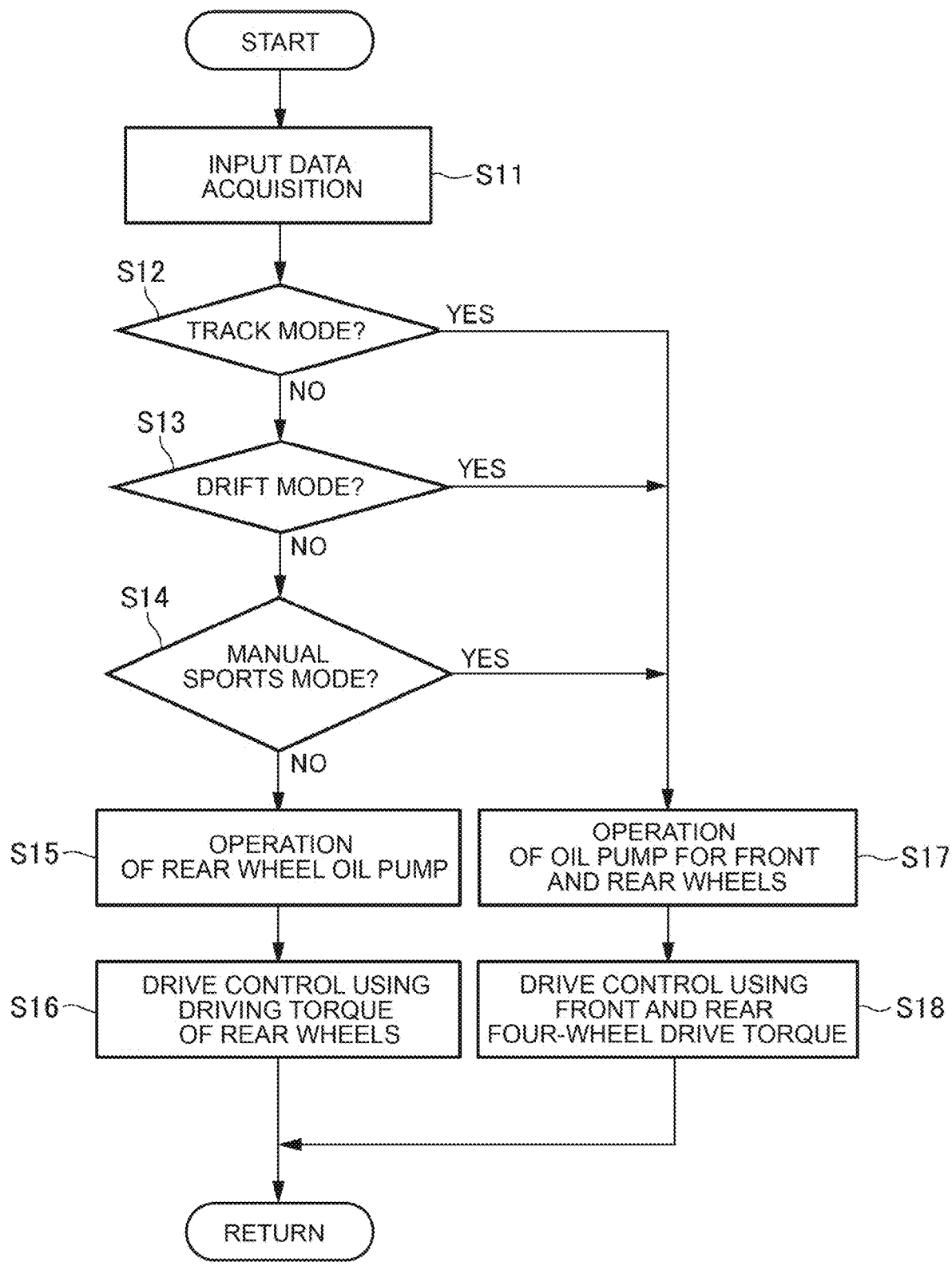
FIG. 11 is a flow chart for describing an exemplary control executed in an embodiment of the present disclosure.

An example of the control by the controller 26 will be described with reference to a flowchart shown in FIG. 11. In the control example illustrated in FIG. 11, first, input data is acquired by a S1. The input data acquired here is an accelerator operation amount, a vehicle speed, a motor temperature, an oil temperature, a shift range, a traveling mode, and the like. Next, it is determined whether or not the four-wheel drive travel mode is selected or set. Specifically, it is determined whether the above-described track mode is selected or set (S2), whether the drift mode is selected or set (S3), or whether the manual Sports mode is selected or set (S4). S2 or S4 may be determined based on the input from the mode selection switch 21 to the controller 26. The order of these determinations is not particularly limited, and may be appropriate.

As described above, in the manual range mode, four-wheel drive traveling is preferable. Therefore, in addition to the above-described S2 or S4, it may be determined whether the manual range mode is selected or set.

The above-described track mode, drift mode, or manual Sports mode is a driving mode selected under a special environment such as circuit driving. Therefore, in the normal state, since the above-described driving modes are not selected, the determination of S2 or S4 is "no". In this case, since the two-wheel drive travel mode which is the normal mode is required or the two-wheel drive travel mode is set and traveling, only the oil pump OPrr, OPrl provided corresponding to the rear wheel 2r, 2l to be the drive wheels is driven to actively supply oil to the motor Mrr, Mrl for the rear wheel 2r, 2l to promote the cool-down (S5). That is, the oil pump OPfr, OPfl provided corresponding to the front wheel 1r, 1l is stopped or maintained in a stopped condition. In this situation, drive control using the drive torques of the left and right rear wheel 2r, 2l is executed (S6). It then returns.

Here, "using the driving torque of the left and right rear wheel 2r, 2l" means that the driving torque of each of the rear wheel 2r, 2l is controlled by a motor Mrr, Mrl provided corresponding to each of the rear wheel 2r, 2l.

When the two-wheel drive travel mode is set, the motor Mfr, Mfl is not energized, and therefore, the motor Mfr, Mfl is not required to be cooled without generating heat. Therefore, the power dissipation of the entire vehicle Ve can be reduced by stopping or maintaining the oil pump OPfr, OPfl provided corresponding to the front wheel 1r, 1l. In other words, it is possible to improve the energy efficiency while suppressing a decrease in the cooling performance of the motor Mrr, Mrl serving as the driving force source in the two-wheel drive travel mode. In other words, by providing an electric oil pump that supplies oil only to the motor Mfr, Mfl that is stopped when traveling in the two-wheel drive travel mode, the oil pump OPrr, OPrl provided corresponding to the rear wheel 2r, 2l needs to have a function to cool the motor Mrr, Mrl, so that the oil pump OPrr, OPrl can be miniaturized.

In the two-wheel drive travel mode, the front wheel 1r, 1l rotates, and thus the rotating members constituting the drive unit Pf rotate at a rotational speed corresponding to the vehicle speed. That is, the mechanical oil pump OPm is activated. Therefore, since the oil is supplied to the lubricated portion of the drive unit Pf, it is possible to prevent the durability of the drive unit Pf from decreasing. In other words, since the oil is supplied only to the place where the oil is to be supplied, the power loss for driving the oil pump can be reduced.

On the other hand, when the determination of either S2 or S4 is "yes", the vehicle travels in the four-wheel drive travel mode or is required to switch from the two-wheel drive travel mode to the four-wheel drive travel mode, so that the oil pump OPfr, OPfl, OPrr, OPrl provided corresponding to each of the front and rear four-wheels is driven to actively supply oil to the motor Mfr, Mfl, Mrr, Mrl to promote the cooling (S7). In this situation, drive control using the drive torque of the front and rear four wheels is executed (S8). It then returns.

Here, the "drive control using the drive torque of the front and rear four wheels" is control to drive and travel the vehicle Ve by individually controlling the motor Mfr, Mfl, Mrr, Mrl provided corresponding to each of the front and rear wheels 1r, 1l, 2r, 2l and individually controlling the drive torque of each wheel 1r, 1l, 2r, 2l, and appropriately controls the distribution ratio of the torque of the front and rear wheels, the distribution ratio of the torque of the left and right wheels, and the like in accordance with various requirements such as the required drive torque, the gradient angle of the traveling path, or the turning radius.

The track mode, the drift mode, or the manual sport mode described above is usually set in a special situation such as a circuit running, and the mode selection switch 21 is operated when the vehicle is stopped in the normal mode, and thereafter, the vehicle travels by performing an accelerator operation or the like according to the selected driving mode. That is, it is required to drive the motor Mfr, Mfl after the driving mode is switched. Therefore, in the above-described control example, the operation of the mode selection switch 21 is used as a means for predicting the traveling in the four-wheel drive travel mode.

Then, when the mode selection switch 21 is operated as described above and it is predicted that the vehicle travels in one of the travel modes of the track mode, the drift mode, and the manual sport mode, by starting to operate the stopped oil pump OPfr, OPfl, the motor Mfr, Mfl can be supplied with oil and cooled before the motor Mfr, Mfl is energized to generate heat. As a consequence, since the oil pump OPfr, OPfl can be operated at the time of traveling in the four-wheel drive travel mode, the cooling performance of the motor Mfr, Mfl can be suppressed from being deteriorated.

When the oil pump OPfr, OPfl, OPrr, OPrl is operated as described above, the rotational speed of each oil pump OPfr, OPfl, OPrr, OPrl, that is, the quantity of the oil supplied to the motor Mfr, Mfl, Mrr, Mrl, is preferably determined in accordance with the temperature of each motor Mfr, Mfl, Mrr, Mrl. Specifically, it is preferable that the higher the temperature of the motor Mfr, the higher the rotational speed of the oil pump OPfr, the higher the temperature of the motor Mfl, the higher the rotational speed of the oil pump OPfl, the higher the temperature of the motor Mrr, the higher the rotational speed of the oil pump OPrr, and the higher the temperature of the motor Mrl, the higher the rotational speed of the oil pump OPrl.

As described above, the motor Mfr, Mfl, Mrr, Mrl can be cooled without excess or deficiency by controlling the rotational speed of the oil pump OPfr, OPfl, OPrr, OPrl in accordance with the temperature of the motor Mfr, Mfl, Mrr, Mrl.

Figure 12:
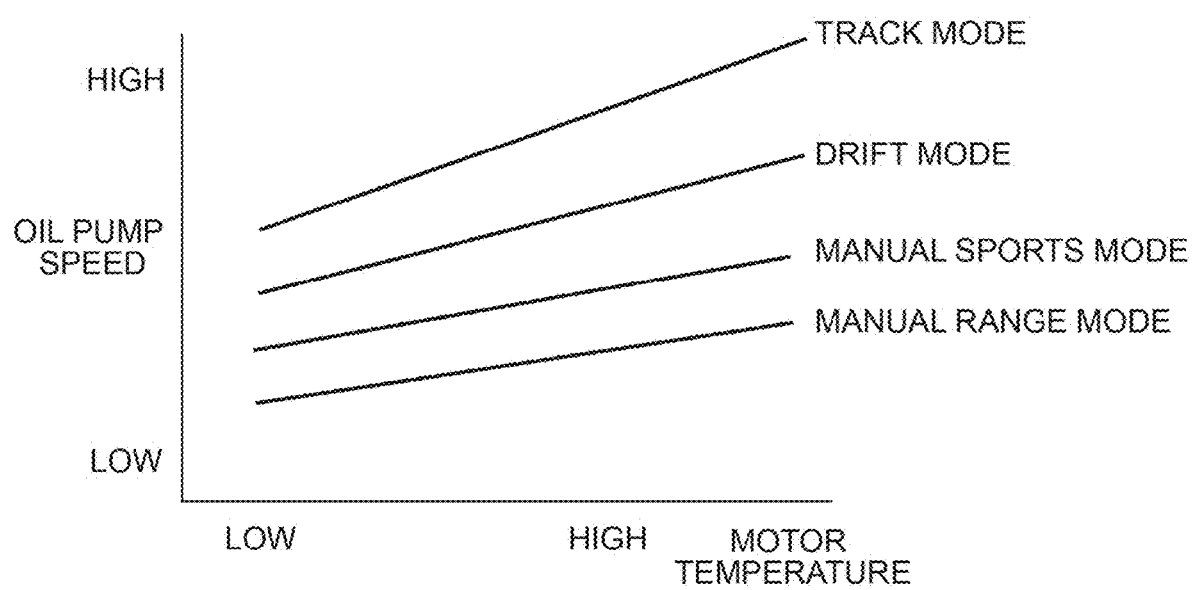
FIG. 12 is a diagram illustrating an example of a map that determines the rotational speed of the oil pump for each traveling mode.

In the track mode, the drift mode, the manual Sports mode, and the manual range mode described above, the required driving torque tends to increase in that order. Therefore, it is preferable to set the rotational speed of the oil pump OPfr, OPfl, OPrr, OPrl to be high in the order of the track mode, the drift mode, the manual Sports mode, and the manual range mode. That is, it is preferable that the map shown in FIG. 12 in which the rotational speed of the oil pump OPfr, OPfl, OPrr, OPrl is determined is stored in the controller 26 using the selected travel mode and the motor temperature as parameters, and the respective oil pump OPfr, OPfl, OPrr, OPrl are operated by referring to the map when the vehicle travels in the four-wheel drive travel mode.

By controlling the rotational speed of the oil pump OPfr, OPfl, OPrr, OPrl in accordance with the driving mode selected in this way, the motor Mfr, Mfl, Mrr, Mrl can be cooled without excess or deficiency, and the power dissipation can be reduced.

In electrified vehicle according to the embodiment of the present disclosure, the rear wheel 2r, 2l is used as the drive wheel in the two-wheel drive travel mode, but the front wheel 1r, 1l may be used as the drive wheel, and in such cases, the mechanical oil pump may be provided on the drive unit Pr, and the oil pump OPrr, OPrl may be stopped in the two-wheel drive travel mode.

Further, the vehicle Ve may be provided with a mechanical oil pump in the drive unit Pf and the drive unit Pr, and in such cases, the drive wheels at the time of traveling in the two-wheel drive travel mode may be appropriately switched between the front wheel 1r, 1l and the rear wheel 2r, 2l in accordance with the traveling environment or the like. When the drive wheels are switched in the two-wheel drive mode as described above, the oil pump OPrr, OPrl (OPfr, OPfl) provided in the drive unit Pr (Pf) that differs from the drive unit Pf (Pr) connected to the drive wheels may be stopped.

Further, in the embodiment shown in FIG. 2, the oil pump for supplying oil to the lubricating portion of the drive unit Pr is not shown, but the lubrication may be appropriately performed by providing a mechanical oil pump on the drive unit Pr. Furthermore, the above-described vehicle Ve may be configured to supply oil from the oil pump OPrr, OPrl to a lubricating portion of the drive unit Pr because the rear wheel 2r, 2l functions as a drive wheel, either in the two-wheel drive travel mode or in the four-wheel drive travel mode.

Furthermore, in the above-described control example, it is predicted that the vehicle travels in the four-wheel drive travel mode on the basis of a signal input from the mode selection switch 21 to the controller 26. However, for example, when it is predicted that the required driving torque is increased up to the driving torque that cannot be satisfied only by the torque of the motor Mrr, Mrl, such as when the change rate of the accelerator operation amount during traveling in the two-wheel driving traveling mode changes at a predetermined change rate, it may be predicted that the vehicle travels in the four-wheel driving traveling mode. That is, it may be predicted that the vehicle travels in the four-wheel drive travel mode based on a signal other than the mode selection switch 21.

What is claimed is:

1. A cooling control device for an electrified vehicle including a first motor that drives a first drive wheel as one of front and rear wheels, a first electric oil pump that supplies oil to the first motor, a second motor that drives a second drive wheel as another of the front and rear wheels, a second electric oil pump that supplies the oil to the second motor, a first drive unit that transfers torque from the first motor to the first drive wheel, a second drive unit that transfers torque from the second motor to the second drive wheel, and a mechanical oil pump driven by the first drive unit to supply the oil to the first drive unit, the electrified vehicle being switchable between a four-wheel drive travel mode in which the first motor and the second motor are used as drive force sources and a two-wheel drive travel mode in which the second motor is used as a drive force source, the cooling control device comprising a controller that controls the first electric oil pump and the second electric oil pump, wherein the controller includes a pump selection unit that drives only the second electric oil pump out of the first electric oil pump and the second electric oil pump when the two-wheel drive travel mode is selected, a prediction unit that predicts traveling in the four-wheel drive travel mode, and a start control unit that starts operating the first electric oil pump when the prediction unit predicts traveling in the four-wheel drive travel mode.

2. The cooling control device according to claim 1, further comprising a mode selection unit operated by a driver to select the four-wheel drive travel mode, wherein the prediction unit predicts traveling in the four-wheel drive travel mode based on presence or absence of an operation of the mode selection unit.

3. The cooling control device according to claim 1, wherein the controller is configured to increase an amount of the oil supplied to the first motor by the first electric oil pump as a temperature of the first motor is higher, and increase an amount of the oil supplied to the second motor by the second electric oil pump as a temperature of the second motor is higher.

4. The cooling control device according to claim 1, wherein:
   the four-wheel drive travel mode includes a plurality of travel modes; and
   the controller is configured to control an amount of the oil supplied to the first motor by the first electric oil pump and an amount of the oil to the second motor supplied by the second electric oil pump according to the travel modes.

5. The cooling control device according to claim 1, wherein the four-wheel drive travel mode includes at least one of a track mode in which a turning performance is enhanced compared to the two-wheel drive travel mode, a drift mode in which driving accuracy is improved, a sport mode in which an acceleration performance or a power performance is improved, and a manual range mode in which driving torque of the first motor and the second motor is controlled based on driving characteristic corresponding to a shift operation by the driver.

* * * * *